Oct. 1, 1963

J. PICKLES 3,105,670

AUTOMOTIVE VEHICLE SEAT ADJUSTMENT
MECHANISM WITH MEMORY DEVICES

Filed June 17, 1957

INVENTOR.
JOSEPH PICKLES
BY Whittemore,
Hulbert & Belknap
ATTORNEYS

INVENTOR.
JOSEPH PICKLES
ATTORNEYS

Oct. 1, 1963

J. PICKLES 3,105,670

AUTOMOTIVE VEHICLE SEAT ADJUSTMENT
MECHANISM WITH MEMORY DEVICES

Filed June 17, 1957

INVENTOR.
JOSEPH PICKLES
BY Whittemore,
Hulbert & Belknap
ATTORNEYS

United States Patent Office 3,105,670
Patented Oct. 1, 1963

3,105,670
AUTOMOTIVE VEHICLE SEAT ADJUSTMENT MECHANISM WITH MEMORY DEVICES
Joseph Pickles, Dearborn, Mich., assignor to Ferro Stamping Company, Detroit, Mich., a corporation of Michigan
Filed June 17, 1957, Ser. No. 665,977
28 Claims. (Cl. 248—420)

The present invention relates to adjustable vehicle seats and more particularly, to such seats equipped with memory devices to provide for movement of the seat from one or more preselected operating positions to a fully retracted position and return to the elected one of said preselected positions by actuation of a single control element.

At the present time the trend in automotive design is to vehicles characterized by minimum overall height. This has presented a serious problem in providing adequate room for the driver and passengers to get into and out of the vehicle. Compounding the difficulties inherent in the reduction of height of the vehicle has been the adoption of multiple seat adjustment. At the present time the so-called six-way seat adjustment is common. This provides for fore and aft adjustment of the seat, vertical adjustment, and a tilting adjusting. The means for providing the vertical and tilt adjustment normally are combined in the form of means for providing for independent or simultaneous vertical adjustment of the front and rear edge of the seat. If the seat has been adjusted for operator comfort to a forward elevated position or a forward and back tilted position, in this position the seat tends to obstruct the door opening. If the seat is moved to a fully retracted position it facilitates entrance to and exit from the vehicle. In the case of multiple adjustable seats, full retraction is considered to be movement of the seat to a limiting position to the rear and downwardly.

In many cases the adjustment of the seat to a comfortable operating position for a particular occupant of the vehicle requires controlled manipulation of three push buttons. Obviously, it is burdensome for the operator to move the seat to its fully retracted position and then to restore it to the desired operating position every time he enters and leaves the vehicle.

It is an object of the present invention to provide a memory control in combination with the adjustable seat which permits the operator to operate a single control member to move the seat to a fully retracted position when he desires to leave the vehicle and to restore the seat to its fully adjusted position by operation of the same or a different control member when he returns to the vehicle.

More specifically, it is an object of the present invention to provide power seat adjustment mechanism including a motor, manual means for controlling the motor to effect a predetermined adjustment of the seat, memory control means operable to move the seat from any preselected operating position to a retracted position, and operable to move the seat from the fully retracted position to the pre-selected operating position.

It is a further object of the present invention to provide positioning means including a motor means, a member movable by operation of the motor means, a motor control device operated as a result of arrival of said member at a predetermined limiting position effective to stop said motor means, and a motor control device operated by return of said member from said limited position to any one of a plurality of pre-selected positions.

It is a further object of the present invention to provide positioning apparatus including motor means, a member movable by said motor means, means for pre-selecting a plurality of separate operating positions, manually operable means for actuating said motor means to effect movement of said member to a predetermined limiting position, and manually operable means for effecting operation of said motor means to move said member from said predetermined limiting position to any selected one of said pre-selected operating positions.

It is a further object of the present invention to provide position apparatus including motor means, a member movable by operation of said motor means, a manually operable motor control device for initiating operation of said motor to effect movement of said member from a pre-selected intermediate operating position toward a limiting retracted position, a motor control device actuated by arrival of said member at said retracted position effective to stop said motor means, a manually operable motor control device effective to initiate operation of said motor to return said member from said retracted position to said intermediate operating position, and a motor control device operated by return of said member to said pre-selected intermediate operating position effective to stop said motor means.

It is a further object of the present invention to provide apparatus as described in the preceding paragraph in which said motor control devices are all separate from each other.

Other objects and features of the invention will become apparent as the description proceeds, especially when taken in conjunction with the accompanying drawings, illustrating preferred embodiments of the invention, wherein.

While the present invention may be used to control apparatus effective to position any desired structure, it is particularly useful in effecting complete retraction of an adjustable vehicle seat and restoration of the seat to any pre-selected operating position.

Figures 1, 2:
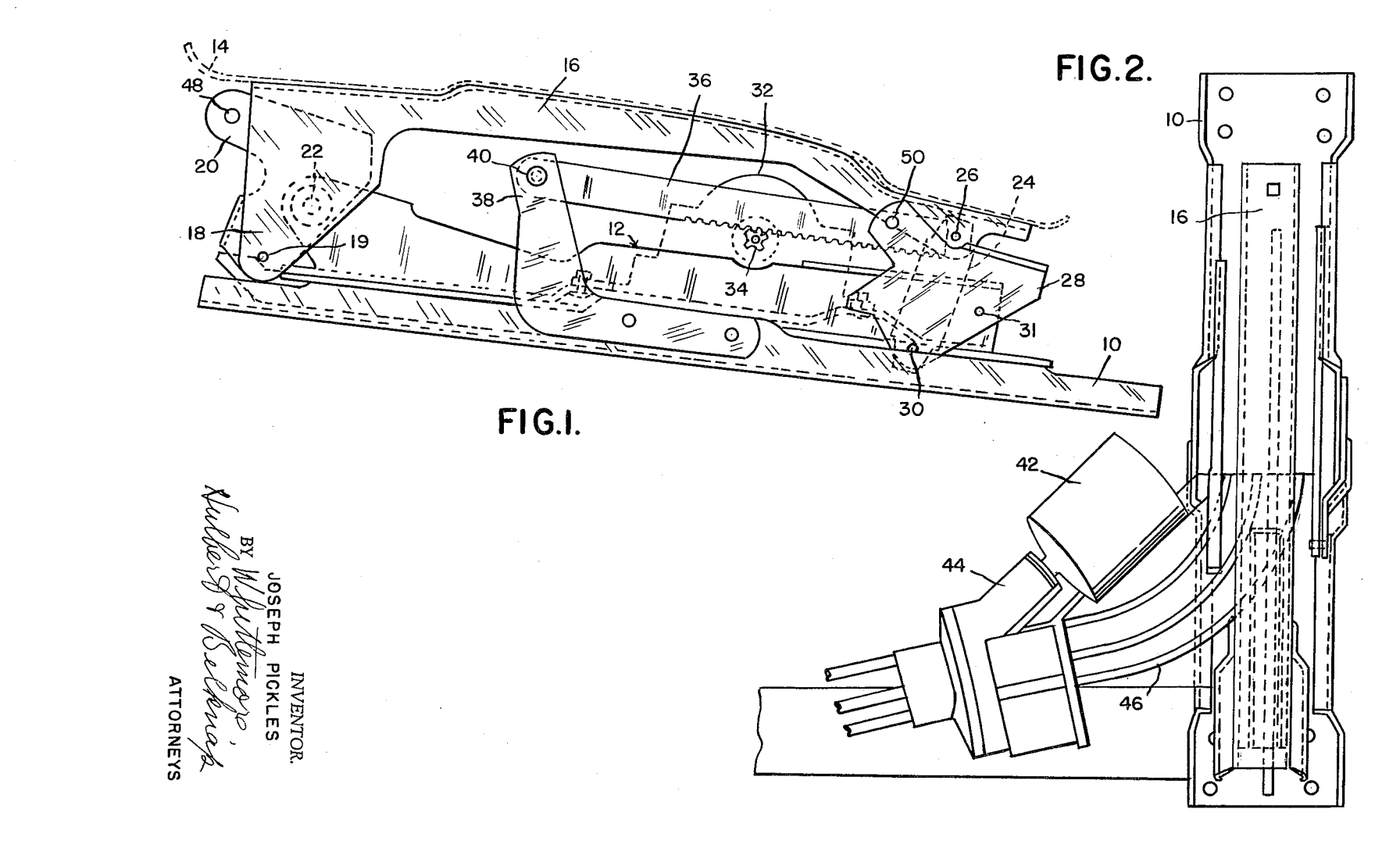
FIGURE 1 is a side elevational view of an adjustable seat support.
FIGURE 2 is a fragmentary plan view of motor means for adjusting the seat.

Referring to FIGURES 1 and 2 there is illustrated seat adjusting apparatus to which the present invention is applicable. The particular power seat adjusting mechanism shown in these figures is shown in complete detail in applicant's prior copending application Serial No. 581,676, filed April 30, 1956 and which issued May 12, 1959 as U.S. Patent No. 2,886,094. However, for completeness herein, the system will be described very briefly.

The structure comprises a pair of assemblies located at opposite ends of the vehicle seat, these assemblies being substantial duplicates of each other so far as operation is concerned. Each assembly comprises a base or track 10 adapted to be fixed to the floor of the vehicle, and an intermediate slide 12 movable fore and aft on the tracks 10 to effect fore and aft adjustment of a seat. The seat itself includes a portion indicated in dotted lines at 14 fixedly engaged to a frame member 16. The frame 16 includes a depending leg 18 at its forward end suspended at 19 from a bell crank lever 20 which is pivoted as indicated at 22 to the forward end of the slide 12. The rear end of the frame 16 is supported by a link 24 pivoted to the frame 16 as indicated at 26 and to a bell crank lever 28 as indicated at 30. The bell crank lever 28 is pivotally supported on the slide 12 as indicated at 31. Mounted on the slide 12 is a drive unit 32 including a plurality, and in the present case three, pinions one of which is indicated at 34. The pinion 34 is in mesh with a rack 36 one end of which is pivotally connected to a rigid arm 38 carried by the base 10 as indicated at 40. Rotation of the pinion 34 causes it to roll along the rack 36 with consequent fore and aft movement of the slide 12.

The power for effecting rotation of the pinion 34 and two additional pinions whose function will subsequently appear, is provided by a motor 42 including selectively actuated clutches within a housing 44 operable to selectively connect the motor to flexible drive cables indicated generally at 46 to in turn effect rotation of a selected one or more of the several pinions referred to.

An additional rack (not shown) is connected to a pivot connection 48 on the bell crank 20 and when this rack is actuated by a second one of the aforementioned pinions, the bell crank is rocked about the axis of its pivot support 22, thus raising and lowering the front end of the seat. In like manner, the bell crank 28 has a third rack pivotally connected thereto at the pivot connection indicated at 50 and when this rack is actuated by the third one of the aforementioned pinions, the bell crank lever 28 is oscillated about its pivot support 31, thereby raising and lowering the rear edge of the seat 14. The link 24 permits independent adjustment of the front and rear edge of the seat.

Figure 3:
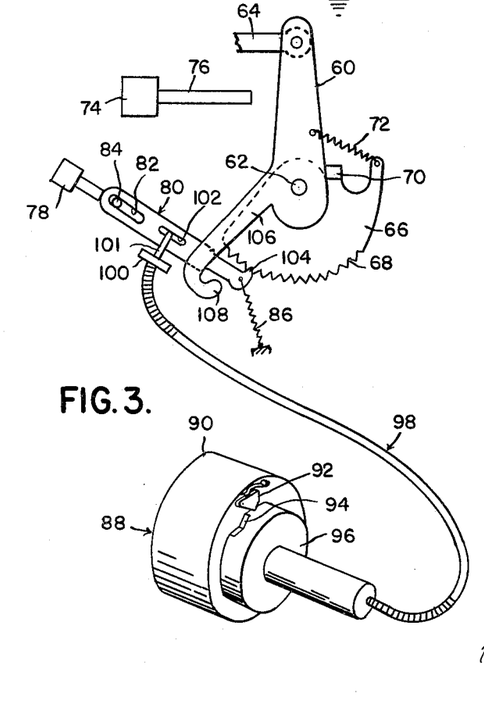
FIGURE 3 is a schematic view of memory control mechanism associated with the seat shown in FIGURES 1 and 2.

Referring now to FIGURE 3 there is illustrated memory control equipment which may be applied to the seat adjusting mechanism described in FIGURES 1 and 2 and which of course is applicable to any type of power actuated seat adjustment, whether the adjustment effected is two-way, four-way, six-way, or of other type.

As seen in FIGURE 3 there is provided a first movable member 60 which is mounted on a stationary pivot support indicated at 62. The member 60 is suitably connected to the vehicle seat or seat adjusting mechanism by means such for example as a link indicated at 64 so that the member is rocked about its pivot support 62 during adjustment of the seat. It will be appreciated that in the case of a so-called six-way seat adjustment, three members similar to the member 60 will be provided, each of which is moved in accordance with one of the three reversible adjustments. Mounted on the same pivot support 62 is a second member 66 which is illustrated includes a ratchet sector 68. Abutment means are provided between the members 60 and 66 and as illustrated, comprise an abutment portion 70 formed on the member 66 and engageable with an edge of the member 60. A spring 72 interconnects the members 60 and 66 and operates in a direction to maintain the abutment portion 70 in engagement with the member 60, although permitting independent motion between said members as will subsequently appear. For convenience, it may be assumed that the member 60 is connected to the seat adjusting mechanism so as to be actuated by fore and aft movement of the seat. In this case a motor means control device which may be in the form of a switch 74 is provided including an actuator 76 adapted to be engaged by the member 60 when the seat reaches its fully retracted or rearmost position. The switch 74 is in control of the motor means for effecting rearward movement of the seat and may operate to interrupt the circuit to the motor or may serve to suitably actuate a solenoid controlling a clutch connecting the motor to the pinion 34 which effects fore and aft movement of the seat. Where a plurality of memory units are provided to permit complete retraction of a six-way seat for example, the switch 74 will of course control the solenoid actuated clutch to permit continued operation of the motor to effect retraction of the seat in a different direction if not completed.

A second motor control device which may also be in the form of a switch 78, is provided and its purpose is to stop operation of the motor means when the member 60 has returned to an intermediate pre-selected operating position. This is accomplished in the present instance by means of a switch actuator 80 having an elongated slot 82 by means of which the actuator is supported by a stationary pin 84. The spring 86 biases the actuator 80 in a direction away from the switch 78.

Mounted for convenient actuation within the vehicle, as for example on the dash thereof, is a manually operable control indicated generally at 88. The control includes a knob 90 which is rotatable to the right or left from an intermediate position and which is self-centering, the centered position being effected when a spring pressed locator 92 on the knob engages in a limiting recess 94 on a stationary mounting portion 96 of the control. The control includes a Bowden wire 98 the tubular portion of which engages a fixed support 100 and the wire 101 of which extends into an elongated slot 102 provided in the actuator 80. The connection of the knob 90 is such that upon rotation in either direction from its centered position, it exerts a push on the wire 101. The actuator 80 includes a pawl or tooth 104 engageable in a corresponding ratchet tooth of the member 66. Thus, when the knob 90 is rotated in either direction from its intermediate centered position, the actuator 80 is swung counterclockwise about the support afforded by the pin 84 and the pawl thereon firmly engages a ratchet tooth of the member 66. The same movement of the knob 90 energizes the motor means to effect a movement of the seat either toward or away from its fully retracted position dependent upon which direction the knob is turned. It will be understood that in the simple case, the motor means control devices referred to may be simple switches effective simultaneously to energize the motor in forward or reverse direction as required and to energize the appropriate clutch to effect driving in the proper direction of the appropriate pinion. It will further be apparent that the motor control devices or switches incorporated in the control 88 and the switches 74 and 78 are connected completely independently of the switches for effecting the usual adjustment of the seat as disclosed in my prior copending application. Moreover, it will be apparent that the switches 74 and 78 are normally closed except when actuated by movement of the members 76 and 80. Further, the switch 74 is in series with the switch which effects operation of the motor and clutch to produce rearward movement of the seat. Accordingly, when the seat reaches its predetermined retracted position, the switch 74 is opened, thus stopping operation of the motor means and effecting termination of seat movement. In the same way, the switch 78 is in series with the switch in the control 88 which initiates operation of the motor and clutch means to produce a restoring movement of the seat from its retracted position to the preselected operating position. Thus, when the seat is restored to its pre-selected operating position, the switch 78 opens and further operation of the motor means is terminated.

The knob 90 is retained in either right or left hand rotated position during movement of the seat and such rotation of the knob retians the pawl 104 in engagement with the teeth of the ratchet sector 68. However, when the seat has reached its fully retracted positioon the knob is released. At this time, unless other means were provided, the actuator 80 would be reelased and its pawl 104 disengaged from the teeth of the ratchet sector 68. This in turn would release the member 66 for swinging movement and it would move under the influence of the spring 72 until its abutment 70 engaged the edge of the member 60. In order to prevent this, the member 60 includes an arm portion 106 having a head 108 adapted to overlie the end of the actuator 80 which carries the pawl 104. Thus, when the seat is moved to its fully retracted position the head 108 engages the pawl end of the actuator 80 and mechanically prevents separation between the pawl 104 and the teeth of the ratchet sector 68. When the knob 90 is rotated in the opposite direction to restore the seat to operating position, the head 108 moves away from the movable end of the actuator 80, but at this time the pawl will remain in engaged position by reason of pressure applied to the wire 101 of the Bowden wire 98. When the seat reaches its predetermined position the member 60 engages the abutment portion 70 of the member 66 and effects a slight rotation thereof which is imparted to the actuator 80 to open the normally closed switch 78.

The complete operation of the memory unit illustrated in FIGURE 3 will be apparent from the foregoing but will be briefly described for completeness. With the knob 90 in its center position the pawl 104 is free from the ratchet sector 68 and accordingly, the member 66 is free to move with the member 60. If it happens that the seat is at its fully retracted position, the first initial movement of the members 60 and 66 away from such position releases the pawl 104 and thereafter the member 66 is free to follow the member 60. At this time therefore the operator may adjust the seat in the usual manner both as to fore and aft position, vertical position or the condition of tilt. When the operator wishes to leave the vehicle he turns the knob 90 in the appropriate direction, thus pushing the actuator 80 upwardly as seen in the figure, and engaging the pawl in a tooth of the ratchet sector 68. This is sufficient to retain the member 66 in whatever position it happens to be. Rotation of the knob also closes the switch energizing the motor in the appropriate direction and energizing the appropriate solenoid to effect rearward movement of the seat, or rearward and downward movement thereof. When the seat reaches its limiting position the switch 74 is opened. In the case of a six-day adjustable seat three such switches will be opened sequentially as the seat reaches limiting position in the three directions. At this time the operator releases the knob 90 which returns to centralized position. Pawl 104 would normally disengage from the ratchet sector 68 but in the position of extreme travel, the head 108 mechanically engages the pawl and prevents such disengagement. When the operator wishes to restore the seat to its position of adjustment he turns the knob 90 in the opposite direction, thus closing a switch to effect operation of the motor in the appropriate direction and energization of the appropriate solenoid to actuate the adjustment mechanism to move the seat towards its adjusted position. When the seat reaches its initial position of adjustment the member 60 engages the abutment portion 70 and effects a slight movement of the actuator 80, thus opening the switch 78 and terminating operation of the motor means. In the case of six-way seat adjustment, the motor continues to operate until all of the three adjustments have been completed, each adjustment being terminated by actuation of a solenoid controlled switch. When the seat has been restored to its intermediate adjusted operating condition, the operator releases the knob 90 which releases the pawl 104 from the ratchet sector 68 and all corresponding pawls.

It will be recognized thta in FIGURE 3 the parts are shown in the position reached when the seat has been restored to its operating position, the knob 90 being assumed to be momentarily retained in its rotated position. Rotation of the knob retains the pawl 104 in engagement with the ratchet teeth. The actuator 80 has opened switch 78. The head 108 of the arm 106 is spaced from the pawl end of the actuator 80 so that when the knob 90 is released and returns to its centralized position, the pawl 104 will disengage from member 66. The member 66 will however, remain in its adjusted position since its abutment portion 70 is in contact with member 60 and will be reained there by spring 72.

Figure 3A:
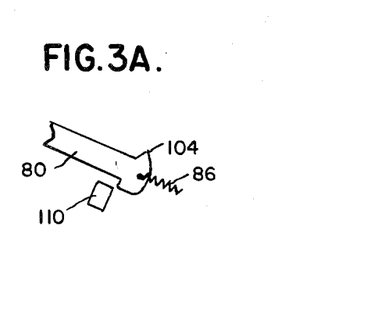
FIGURE 3A is a fragmentary view showing an alternative method of blocking the actuator.

In FIGURE 3A there is shown an alternative arrangement in which a member 110 which may be a part of the seat construction, is movable into engagement with the head of member 80 when the seat is fully retracted.

From the foregoing it will be seen that the memory control device consists of a single actuator in which the operator moves a single control knob in one direction to effect retraction of the seat in any one of a plurality of directions, rotation of the knob in the opposite direction being effective to restore the seat to its pre-selected operating condition in respect to all three possible adjustments thereof.

The memory device does not interfere with the usual and normal seat adjustment by the usual control means separate from the memory control system. When the memory control mechanism is not being used, the spring 86 retains the pawl 104 of the actuator 80 out of contact with the teeth of the ratchet disc 66. Thus, any driver of the vehicle may adjust the seat to the required position and without any pre-setting operation being required, merely operate the memory switch to retract the seat to its fully retracted position. Thereafter, the driver of the vehicle may return to the automobile and actuate the memory switch controlling restoring movement of the seat and it will move back to its initial position whatever it was.

Figure 4:
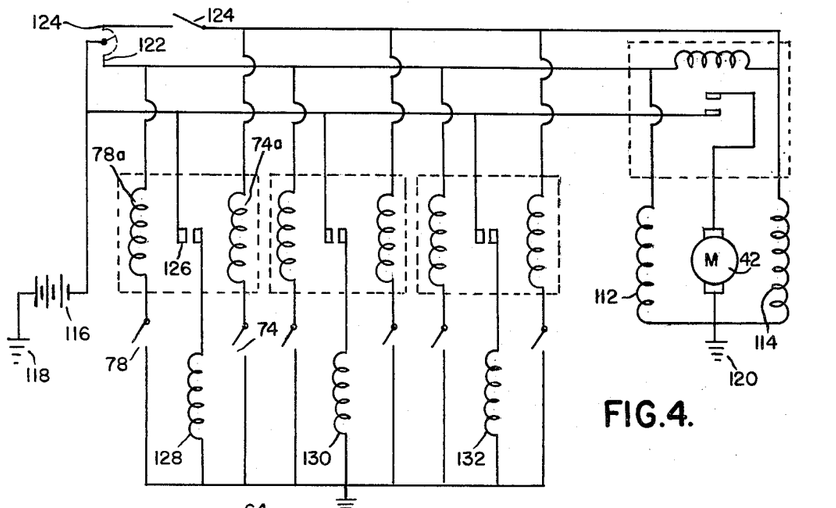
FIGURE 4 is a wiring diagram applicable to the system.

Referring now to FIGURE 4 there is illustrated a wiring diagram for a memory system as applied to a six-way seat adjustment. In this FIGURE the motor 42 which effects power adjustment of the seat is illustrated and is provided with forward and reverse windings 112 and 114 respectively. The power source indicated in the diagram is a battery 116 grounded as indicated at 118, the motor 42 being grounded as indicated at 120. The two control switches actuated by right or left hand rotation of the knob 90 are indicated at 122 and 124. Normally closed switches 74 and 78 are indicated in FIGURE 4 each being in series with a relay winding 74a and 78a respectively, adapted to close the contacts 126 to apply current to a solenoid winding 128 which will actuate the clutch to connect the horizontal drive pinion 34 to the motor 42. The solenoids 130 and 132 may control respectively the pinions for effecting rocking of the front bell crank 20 and the rear bell crank 28. Each of these solenoids is associated in circuit relays and switches identical in arrangement with the relays 74a and 78a and the relay contacts 126.

Figure 5:
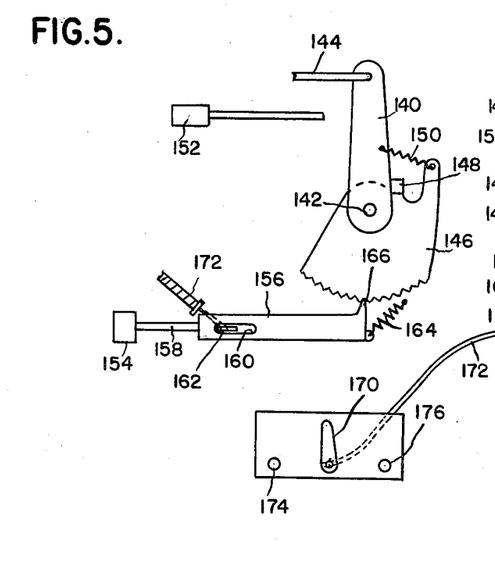
FIGURE 5 is a diagrammatic view of a second form of memory control mechanism associated with the seat shown in FIGURES 1 and 2.
Figure 6:
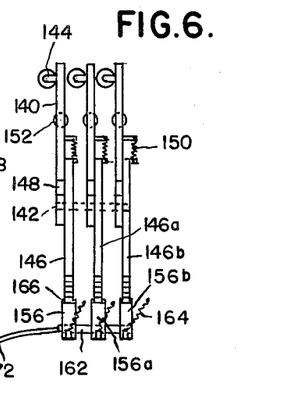
FIGURE 6 is a diagrammatic view showing the application of the structure shown in FIGURE 5 to a seat including a plurality of separate adjustments.
Figures 7, 8:
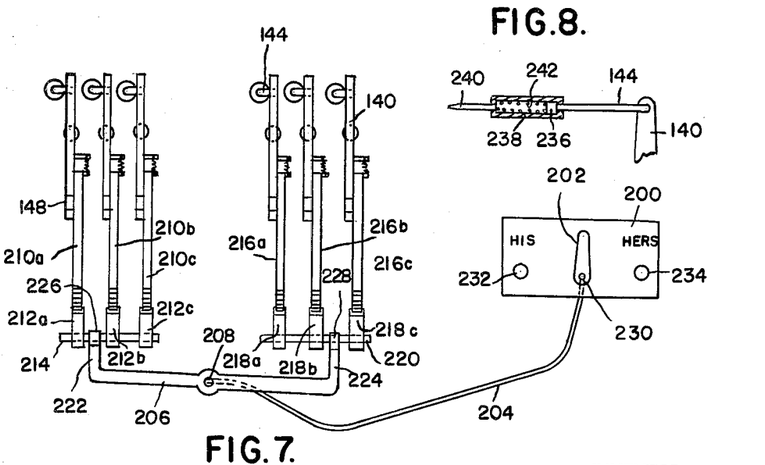
FIGURE 7 is a diagrammatic view similar to FIGURE 6 showing the application of the invention to provide for memory control to return the seat to any one of a plurality of previously adjusted pre-selected positions.
FIGURE 8 is a detailed fragmentary view partly in section showing a modified construction.

Referring now to FIGURES 5–7 there is shown a memory system which may be preset to provide a plurality of different intermediate operating positions in conjunction with actuating means selectively operable to move the seat from any of the pre-selected operating positions to a retracted position and to move the seat from the retracted position to any selected one of the pre-selected operating positions. For this purpose the memory system requires manual manipulation of a device to first set the memory system and operation of two or more switches in addition to effect retraction and restoration of the seat. As seen in FIGURE 5 the memory system comprises a member 140 which is pivoted as indicated at 142 and is connected by suitable means such as the link 144 to a portion of the seat or actuating mechanism therefor. Again, for simplicity it will be assumed that the structure shown in FIGURE 5 is adapted to be actuated by horizontal adjustment of the seat but one or more additional assemblies similar to the structure shown in FIGURE 5 may be provided in the case of multiple seat adjustment.

A ratchet sector 146 is connected to the member 140 by the pivot connection 142 and is independently rotatable on this pivot. The member 146 includes an abutment portion 148 engageable with a side of the member 140, and a tension spring 150 is provided connecting members 140 and 146 and urging them together to keep the abutment portion 148 in contact with the member 140.

Positioned to be actuated by the member 140 when it is swung to a predetermined position corresponding to fully retracted position of the seat is a normally closed switch 152. A second normally closed switch 154 is provided which is adapted to be opened when the seat is restored to its pre-selected intermediate operating position.

For actuating the switch 154 at the proper time there is provided an actuator 156 engageable with an extension 158 of the switch 154 when the actuator 156 is moved slightly. Actuator 156 includes an elongated slot 160 which receives a flattened rotary support shaft 162 supporting the actuator 156 adjacent the switch 154. A tension spring 164 is connected to the actuator and urges it to the right as seen in FIGURE 5, thus normally maintaining the left hand end of the slot 160 against the shaft 162 in a position in which the switch 154 remains closed. The spring 164 is connected to the actuator 156 in such a way that it provides a component of force effective to hold a pawl 166 on the actuator 156 in engagement with a tooth space of the ratchet sector 146 and thus to hold the ratchet against angular movement about its pivot support 142.

Associated with the actuator 156 is a setting knob 170 conveniently mounted on the dash of the vehicle and including a flexible cable 172 connected to the set of three actuators of which 156 is one, the other two being indicated at 156a and 156b. The actuators are associated with their respective ratchet sectors 146, 146a and 146b. The actuators 156a and 156b and the ratchet sectors 146a and 146b are provided for effecting the required vertical adjustment at the front and back edge of the seat.

The connection between the flexible cable 172 and the actuating members is by connection to the flattened rotary support shaft 162. Thus, the knob 170 may be rotated from its intermediate neutral position and this movement in the appropriate direction will swing the actuators 156, 156a and 156b clockwise as seen in FIGURE 5, to withdraw the pawls from the ratchet sectors. At this time the springs 150 will serve to swing the several ratchet sectors the required amount to engage the abutment portions thereof against the sides of their related members such as 140. Thereafter, the knob 170 is restored to its vertical position and the springs 164 are thereupon effective to move the actuators 156, 156a and 156b to engage the pawls thereof in the respective ratchet sectors.

Referring again to FIGURE 5 the parts are illustrated in the position which they will occupy when the respective memory device has restored the seat to its pre-selected intermediate operating position. At this time the actuator 156 has been moved slightly to the left a distance sufficient to open the switch 154. The adjacent edge of the member 140 is substantially spaced from the normally closed switch 152.

Adjacent the setting knob 170 on the dash is provided a pair of switch actuators 174 and 176. The switch 174 which for example is shown as being of the "push button" type, may be connected to energize the motor 42 in the appropriate direction and to actuate the appropriate one of the clutches to drive the pinion 34 in the proper direction to move the seat to retracted position. The switch 174 will be maintained closed and operation will continue until the switch 152, which is in series with the switch 174, opens to terminate rearward movement of the seat. To restore the seat to its intermediate operating condition, the driver moves switch 176 which energizes the motor in the reverse direction and closes the appropriate switch to drive the pinion 34 in the opposite direction. Forward movement of the seat continues until as it approaches the preset position, the member 140 comes into engagement with the abutment portion 148 of the member 146. Slight additional movement of the member 140 swings the member 146 and the actuator 156 to open switch 154.

Referring now to FIGURE 7 there is shown a similar arrangement which provides a further selected intermediate position which may be preset and used over and over without interference with the use of another selected preset intermediate operating position. As seen in this FIGURE, the dash of the vehicle is provided with a plate 200 having a knob 202 movable to the right or left and marked for example "His" and "Hers" to indicate the direction in which the knob should be turned to effect one of the plural presetting adjustments of the device. Associated with the knob 202 is the flexible torsion cable 204 which is connected to a rocker member 206 mounted for angular movement about a pivot support 208. In this case double sets of ratchet sectors and pawls toothed actuators are provided. For example, the system may include ratchet sectors 210a, 210b and 210c respectively engageable by pawl teeth on switch actuators 212a, 212b and 212c. The actuators 212a, 212b and 212c may be supported for longitudinal sliding movement and angular movement on the flattened portion of a support shaft 214 similar in all respects to the shaft 162 previously described. A second set of ratchet sectors 216a, 216b and 216c is associated with corresponding pawl toothed switch actuators 218a, 218b and 218c. Again, these actuators are supported for independent sliding movement and simultaneous angular movement by a flattened support shaft 220 similar in all respects to the shaft 214. The shafts 214 and 220 are selectively rotated by means including abutment portions 222 and 224 respectively at the ends of the rocker 206. Any suitable means such for example as laterally extending arms 226 and 228 rigidly connected respectively to the shafts 214 and 220 may be provided. Rotation of the rocker 206 clockwise rocks the shaft 214 against the force of a spring similar to the spring 164 shown in FIGURE 5, in a direction to release the pawl teeth of the actuators 212a, 212b and 212c, and upon return to centralized position by the knob 202 the spring is effective to move the actuators to lock the respective ratchet sectors in adjusted position. Movement of the knob 202 in the opposite direction when the seat is in a different position of adjustment, has the effect of setting up the required adjustment of the associated ratchet sectors to establish a memory condition for the second desired position of adjustment.

The plate in this case in provided with a centralized switch 230, illustrated as of the "push button" type, which when closed initiates movement of the seat from any intermediate position of adjustment toward its fully retracted position as previously described. This mechanism however provides for selective return of the seat to either of the two predetermined intermediate operating positions. For this purpose separate switches, which may for convenience be designated "His" and "Hers" and which are respectively illustrated as of the "push button" type at 232 and 234, are provided. The switch 232 is in series with the limit switches adapted to be actuated by the actuators 212a, 212b, and 212c and accordingly, as the associated limit switches are opened, the particular restoring movement of the seat is terminated. At the same time the switch 234 is in series with the limit switches adapted to be actuated by the actuators 218a, 218b and 218c.

It will thus be apparent that the seat may be moved at random to any intermediate position and a memory condition set up by rotation of the knob 202 to the left and return. The seat may be moved to a second intermediate position and a memory condition established by rotation of the knob 202 to the right and return. Thereafter, closure of the switch 230 will move the seat to retracted position from either of the preset intermediate positions (or in fact from any intermediate position whether preset or not), and selective closure of the switches 232 and 234 will provide for corresponding selective return of the seat to either of the two preset intermediate operating conditions.

The last arrangement requires a provision to permit independent adjustment of the seats without destroying the setting established by manipulation of the knob 202. For this purpose the links 144 which are illustrated as connected to the members 140, are connected to the seat or seat actuating mechanism by suitable lost motion devices. In FIGURE 8 the lost motion device is illustrated as comprising a head 236 movable in a closed cylindrical portion 238 in a connecting link 240, the closed cylindrical portion including a compression spring 242. The strength of the spring is such that the links 240 and 144 move as a unit except when movement of the link 240 moves the member 140 into engagement with the abutment portion 148 and attempts to move it beyond this position. If such motion is effected by the separate manual control system for the seats or by the memory control system employing a different set of ratchet sectors and actuators, then the additional movement required of the member 140 is permitted by compression of the spring 242. Thus, operation of one memory system which is adapted to move the seat further forwardly or further upwardly than the setting of a second memory system does not disturb the setting and does not force disengagement between the associated pawl teeth and ratchet sectors.

The drawings and the foregoing specification constitute a description of the improved automotive vehicle seat adjustment mechanism with memory devices in such full, clear, concise and exact terms as to enable any person skilled in the art to practice the invention, the scope of which is indicated by the appended claims.

What I claim as my invention is:

1. An adjustable vehicle seat, seat adjusting means including a motor, a motor circuit including a first manually operable switch effective to initiate motor operation in a direction to retract said seat, a fixed limit switch effective to terminate motor operation when said seat reaches fully retracted position, a second manually operable switch effective to initiate motor operation in a direction to move said seat away from retracted position, an adjustable limit switch effective to terminate motor operation when said seat reaches a pre-selected intermediate position determined by the adjustment of said adjustable limit switch, and automatic means responsive to movement of said seat for adjusting said adjustable limit switch to a position determined by any instantaneous intermediate position of said seat.

2. An adjustable vehicle seat, seat adjusting means including a motor, a motor circuit including a first manually operable switch effective to initiate motor operation in a direction to retract said seat, a fixed limit switch effective to terminate motor operation when said seat reaches fully retracted position, a second manually operable switch effective to initiate motor operation in a direction to move said seat away from retracted position, an adjustable limit switch effective to terminate motor operation when said seat reaches a pre-selected intermediate position determined by the adjustment of said adjustable limit switch, means for adjusting said adjustable limit switch to a position determined by any instantaneous intermediate position of said seat comprising a support, a movable member on said support normally connected to said seat for movement therewith, resilient means connecting said seat and member, manually operated selector means engageable with said member in any intermediate position thereof, and abutment means between said seat and member engageable when said seat returns to the pre-selected position.

3. Memory controlled apparatus comprising a motor, a support, a first member on said support and connected to said motor for movement thereby, a motor control circuit including a limit switch, a switch actuator mounted for limited movement between switch opening and switch closed position, an adjustable member on said support normally connected to said first member for movement therewith by interposed abutment means, resilient means connecting said members and normally maintaining said abutment means in engagement, coupling means intermediate said actuator and second member operable to fix said second member in any predetermined intermediate position so that upon movement of said first member by said motor in a first direction causes separation between said abutment means while maintaining said limit switch closed, said abutment means being engageable when said first member is returned to and slightly beyond the position occupied when said coupling means were engaged to move said actuator to open said limit switch.

4. Apparatus as defined in claim 3 which includes means for actuating said coupling means upon energization of said motor.

5. Apparatus as defined in claim 3 which includes a second fixed limit switch connected to said motor to terminate motor operation when said first member reaches a predetermined limiting position, means for actuating said coupling means upon energization of said motor, and means operable when said first member is in said limiting position for preventing release of said coupling means.

6. Apparatus as defined in claim 3 in which said coupling means is normally engaged, and manually operated means for releasing said coupling means temporarily in any intermediate position of said first member to provide for movement of said adjustable member to a corresponding position as determined by said abutment means.

7. Positioning apparatus comprising reversible motor means, a support, a first member movably mounted on said support and connected to said motor means for movement in opposite directions thereby, a second member mounted on said support and movably connected to said first member, abutment means limiting relative movement between said members in one direction, resilient means acting between said members in a direction to keep said abutment means in engagement, operator actuated means for retaining said second member in a predetermined position during operation of said motor means in a direction to separate said abutment means, and a switch actuated by movement of said second member upon re-engagement of said abutment means and effective to terminate operation of said motor means.

8. Positioning apparatus comprising reversible motor means, a support, a pivotally mounted first member movably mounted on said support and connected to said motor means for movement in opposite directions thereby, a second member pivotally mounted on said support and movably connected to said first member, abutment means limiting relative movement between said members in one direction, resilient means acting between said members in a direction to keep said abutment means in engagement, operator actuated means for retaining said second member in a predetermined position during operation of said motor means in a direction to separate said abutment means, and a switch actuated by movement of said second member upon re-engagement of said abutment means and effective to terminate operation of said motor means.

9. Positioning apparatus comprising reversible motor means, a support, a first member movably mounted on said support and connected to said motor means for movement in opposite directions thereby, a second member mounted on said support and movably connected to said first member, abutment means limiting relative movement between said members in one direction, resilient means acting between said members in a direction to keep said abutment means in engagement, operator actuated means for retaining said second member in a predetermined position during operation of said motor means in a direction to separate said abutment means, a first switch actuated by movement of said first member to a predetermined limiting position to terminate operation of said motor means, and a second switch actuated by movement of said second member upon re-engagement of said abutment means and effective to terminate operation of said motor means.

10. Positioning apparatus comprising reversible motor means, a support, a first member movably mounted on said support and connected to said motor means for movement in opposite directions thereby, a second member mounted on said support and movably connected to said first member, abutment means limiting relative movement between said members in one direction, resilient means acting between said members in a direction to keep said abutment means in engagement, operator actuated means for retaining said second member in a predetermined position during operation of said motor means in a direction to separate said abutment means, a first switch actuated by movement of said first member to a predetermined limiting position to terminate operation of said motor means, and a second switch actuated by movement of said second member upon re-engagement of said abutment means and effective to terminate reverse operation of said motor means.

11. Positioning apparatus comprising reversible motor means, a support, a first member movably mounted on said support and connected to said motor means for movement in opposite directions thereby, a second member mounted on said support and movably connected to said first member, abutment means limiting relative movement between said members in one direction, resilient means acting between said members in a direction to keep said abutment means in engagement, operator actuated means for retaining said second member in a predetermined position during operation of said motor means in a direction to separate said abutment means, and a switch actuated by movement of said second member upon re-engagement of said abutment means and effective to terminate operation of said motor means, said second member comprising a ratchet and said operator actuated means comprising a pawl engageable with said ratchet.

12. Positioning apparatus comprising reversible motor means, a support, a first member movably mounted on said support and connected to said motor means for movement in opposite directions thereby, a second member mounted on said support and movably connected to said first member, abutment means limiting relative movement between said members in one direction, resilient means acting between said members in a direction to keep said abutment means in engagement, operator actuated means for retaining said second member in a predetermined position during operation of said motor means in a direction to separate said abutment means, and a switch actuated by movement of said second member upon re-engagement of said abutment means and effective to terminate operation of said motor means, said second member comprising a ratchet and said operator actuated means comprising a pawl engageable with said ratchet, said operator actuated means including an element movable through engagement between the pawl and ratchet upon re-engagement of said abutment means to actuate said switch.

13. Positioning apparatus comprising reversible motor means, a support, a first member movably mounted on said support and connected to said motor means for movement in opposite directions thereby, a second member mounted on said support and movably connected to said first member, abutment means limiting relative movement between said members in one direction, resilient means acting between said members in a direction to keep said abutment means in engagement, operator actuated means for retaining said second member in a predetermined position during operation of said motor means in a direction to separate said abutment means, a switch actuated by movement of said second member upon re-engagement of said abutment means and effective to terminate operation of said motor means, said second member comprising a ratchet and said operator actuated means comprising a pawl engageable with said ratchet, said operator actuated means including resilient means connected thereto to move its pawl away from said ratchet, and means operable during actuation of said motor means effective to lock said pawl in engagement with said ratchet.

14. Positioning apparatus comprising reversible motor means, a support, a first member movably mounted on said support and connected to said motor means for movement in opposite directions thereby, a second member mounted on said support and movably connected to said first member, abutment means limiting relative movement between said members in one direction, resilient means acting between said members in a direction to keep said abutment means in engagement, operator actuated means for retaining said second member in a predetermined position during operation of said motor means in a direction to separate said abutment means, a first switch actuated by movement of said first member to a predetermined limiting position to terminate operation of said motor means, a second switch actuated by movement of said second member upon re-engagement of said abutment means and effective to terminate operation of said motor means, said second member comprising a ratchet and said operator actuated means comprising a pawl engageable with said ratchet, said operator actuated means including resilient means connected thereto to move its pawl away from said ratchet, means operable during actuation of said motor means effective to lock said pawl in engagement with said ratchet, and means carried by said first member engageable with said pawl when said first member is in its predetermined limiting position to retain said pawl in engagement with said ratchet while said motor means is not operating.

15. Positioning apparatus comprising reversible motor means, a support, a first member movably mounted on said support and connected to said motor means for movement in opposite directions thereby, a second member mounted on said support and movably connected to said first member, abutment means limiting relative movement between said members in one direction, resilient means acting between said members in a direction to keep said abutment means in engagement, operator actuated means for retaining said second member in a predetermined position during operation of said motor means in a direction to separate said abutment means, a switch actuated by movement of said second member upon re-engagement of said abutment means and effective to terminate operation of said motor means, said second member comprising a ratchet and said operator actuated means comprising a pawl engageable with said ratchet, said operator actuated means including resilient means connected to said pawl to urge said pawl into blocking engagement with said ratchet, and means to move said pawl away from said ratchet to provide for resetting movement of said ratchet to a position determined by engagement of said abutment means.

16. Memory controlled apparatus comprising a support, a first member movably mounted on said support, motor means connected to said first member to move said first member between a limiting position and a second variably selected position, a first switch actuated by movement of said first member to stop said motor means when said first member reaches limiting position, a second member movably mounted on said support and having an abutment surface engageable by an abutment surface on said first member, resilient means urging said abutment surfaces together, a switch actuator mounted on said support adjacent said second member for movement into and out of engagement therewith to selectively retain said second member from following said first member during movement thereof toward its limiting position.

17. Memory controlled apparatus comprising a support, a first member movably mounted on said support, motor means connected to said first member to move said first member between a limiting position and a second variably selected position, a first switch actuated by movement of said first member to stop said motor means when said first member reaches limiting position, a second member movably mounted on said support and having an abutment surface engageable by an abutment surface on said first member, resilient means urging said abutment surfaces together, a switch actuator mounted on said support adjacent said second member for movement into and out of engagement therewith to selectively retain said second member from following said first member during movement thereof toward its limiting position, and a second switch actuated by movement of said switch actuator caused by movement of said second member through engagement of the abutment surfaces of said first and second members.

18. Memory controlled apparatus comprising a support, a first member movably mounted on said support, motor means connected to said first member to move said first member between a limiting position and a second variably selected position, a first switch actuated by movement of said first member to stop said motor means when said first member reaches limiting position, a second member movably mounted on said support and having an abutment surface engageable by an abutment surface on said first member, resilient means urging said abutment surfaces together, a switch actuator mounted on said support adjacent said second member for movement into and out of engagement therewith to selectively retain said second member from following said first member during movement thereof toward its limiting position, a second switch actuated by movement of said switch actuator caused by movement of said second member through engagement of the abutment surfaces of said first and second members, and operator controlled means connected to said switch actuator to move said switch actuator into engagement with said second member when said first and second members are in any one of said variably selected positions.

19. Memory controlled apparatus comprising a support, a first member movably mounted on said support, motor means connected to said first member to move said first member between a limiting position and a second variably selected position, a first switch actuated by movement of said first member to stop said motor means when said first member reaches limiting position, a second member movably mounted on said support and having an abutment surface engageable by an abutment surface on said first member, resilient means urging said abutment surfaces together, a switch actuator mounted on said support adjacent said second member for movement into and out of engagement therewith to selectively retain said second member from following said first member during movement thereof toward its limiting position, a second switch actuated by movement of said switch actuator caused by movement of said second member through engagement of the abutment surfaces of said first and second members, and operator controlled means connected to said switch actuator to move said switch actuator into engagement with said second member when said first and second members are in any one of said variably selected positions, said operator controlled means also including a switch to initiate operation of said motor means while holding said switch actuator in engagement with said second member.

20. Memory controlled apparatus comprising a support, a first member movably mounted on said support, motor means connected to said first member to move said first member between a limiting position and a second variably selected position, a first switch actuated by movement of said first member to stop said motor means when said first member reaches limiting position, a second member movably mounted on said support and having an abutment surface engageable by an abutment surface on said first member, resilient means urging said abutment surfaces together, a switch actuator mounted on said support adjacent said second member for movement into and out of engagement therewith to selectively retain said second member from following said first member during movement thereof toward its limiting position, a second switch actuated by movement of said switch actuator caused by movement of said second member through engagement of the abutment surfaces of said first and second members, operator controlled means connected to said switch actuator to move said switch actuator into engagement with said second member when said first and second members are in any one of said variably selected positions, said operator controlled means also including a switch to initiate operation of said motor means while holding said switch actuator in engagement with said second member, and means operable upon release of said operator controlled means when said first member has reached its limiting position to prevent disengagement between said second member and said switch actuator.

21. Apparatus as defined in claim 20 in which said second member comprises an arcuate ratchet pivoted to said first member and said switch actuator includes a pawl engageable with said ratchet.

22. Memory controlled apparatus comprising a support, a first member movably mounted on said support, motor means connected to said first member to move said first member between a limiting position and a second variably selected position, a first switch actuated by movement of said first member to stop said motor means when said first member reaches limiting position, a second member movably mounted on said support and having an abutment surface engageable by an abutment surface on said first member, resilient means urging said abutment surfaces together, a switch actuator mounted on said support adjacent said second member for movement into and out of engagement therewith to selectively retain said second member from following said first member during movement thereof toward its limiting position, and operator controlled means to release said actuator from said second member while said first member is in any variably selected position to provide for engagement between said abutment surfaces and to thereafter re-engage said actuator and second member to retain said second member in set position.

23. An adjustable seat frame, reversible motor means connected to said frame to adjust said frame between a limiting position and a plurality of operating positions, a support, a first member movably mounted on said support and connected to said motor means for movement thereby, a second member movably connected to said support for movement thereon relative to said first member, a first limit switch operable by movement of said first member to said limiting position, a second limit switch, an actuator for said second limit switch, means mounting said actuator for limited switch actuating movement toward and away from said second limit switch and for movement into and out of operating engagement with said second member and adapted when in operating engagement therewith to limit movement of said second member to movement corresponding to the switch actuating movement of said actuator, and abutment means acting between said first and second members operable to cause continued movement of said first member following engagement of said abutment means to move said second member and switch actuator to operate said second limit switch.

24. An adjustable seat frame, reversible motor means connected to said frame to adjust said frame between a limiting position and a plurality of operating positions, a support, a first member movably mounted on said support and connected to said motor means for movement thereby, a second member movably connected to said support for movement thereon relative to said first member, a first limit switch operable by movement of said first member to said limiting position, a second limit switch, an actuator for said second limit switch, means mounting said actuator for limited switch actuating movement toward and away from said second limit switch and for movement into and out of operating engagement with said second member and adapted when in operating engagement therewith to limit movement of said second member to movement corresponding to the switch actuating movement of said actuator, abutment means acting between said first and second members operable to cause continued movement of said first member following engagement of said abutment means to move said second member and switch actuator to operate said second limit switch, and resilient means extending between said first and second members operating to urge said abutment means into engagement when said second member is released by said switch actuator.

25. An adjustable seat frame, reversible motor means connected to said frame to adjust said frame between a limiting position and a plurality of operating positions, a support, a first member movably mounted on said support and connected to said motor means for movement thereby, a second member movably connected to said support for movement thereon relative to said first member, a first limit switch operable by movement of said first member to said limiting position, a second limit switch, an actuator for said second limit switch, means mounting said actuator for limited switch actuating movement toward and away from said second limit switch and for movement into and out of operating engagement with said second member and adapted when in operating engagement therewith to limit movement of said second member to movement corresponding to the switch actuating movement of said actuator, abutment means acting between said first and second members operable to cause continued movement of said first member following engagement of said abutment means to move said second member and switch actuator to operate said second limit switch, resilient means extending between said first and second members operating to urge said abutment means into engagement when said second member is released by said switch actuator, and operator actuated memory setting means connected to said switch actuator for controlling movement of said switch actuator into and out of operative engagement with said second member.

26. Structure as defined in claim 25 which comprises resilient means urging said actuator toward operative engagement with said second member.

27. Structure as defined in claim 25 which comprises resilient means urging said actuator out of operative engagement with said second member, and an operator actuated switch for initiation operation of said motor means in either direction, said memory setting means being connected to said operator actuated switch for automatic actuation during actuation of said operator actuated switch, and additional means operable to prevent separation between said switch actuator and second member when said operator actuated switch is released with said first member in said limiting position.

28. An adjustable seat frame, reversible motor means connected to said frame to adjust said frame between a limiting position and a plurality of operating positions, a support, a first member movably mounted on said support and connected to said motor means for movement thereby, a second member movably connected to said support for movement thereon relative to said first member, a first limit switch operable by movement of said first member to said limiting position, a second limit switch, an actuator for said second limit switch, means mounting said actuator for limited switch actuating movement toward and away from said second limit switch and for movement into and out of operating engagement with said second member and adapted when in operating engagement therewith to limit movement of said second member to movement corresponding to the switch actuating movement of said actuator, resilient means urging said actuator out of operative engagement with said second member, abutment means acting between said first and second members operable to cause continued movement of said first member following engagement of said abutment means to move said second member and switch actuator to operate said second limit switch, resilient means extending between said first and second members operating to urge said abutment means into engagement when said second member is released by said switch actuator, operator actuated memory setting means connected to said switch actuator to control movement of said switch actuator into and out of operative engagement with said second member, and an operator actuated switch for initiating operation of said motor means in either direction, said memory setting means being connected to said operator actuated switch for automatic actuation during actuation of said operator actuated switch, and additional means operable to prevent separation between said switch actuator and second member when said operator actuated switch is released with said first member in said limiting position.

References Cited in the file of this patent

UNITED STATES PATENTS

| | | |
|---|---|---|
| 945,472 | Moores | Jan. 4, 1910 |
| 1,199,924 | Queeney | Oct. 3, 1916 |
| 1,560,057 | Hunter | Nov. 3, 1925 |
| 1,575,010 | Scheer | Mar. 2, 1926 |
| 2,446,393 | Russell | Aug. 3, 1948 |
| 2,588,165 | Rossmann | Mar. 4, 1952 |
| 2,809,688 | Brundage | Oct. 15, 1957 |
| 2,823,949 | Williams et al. | Feb. 18, 1958 |
| 2,829,002 | Leavengood | Apr. 1, 1958 |
| 2,886,094 | Pickles | May 12, 1959 |
| 2,890,299 | Adams | June 9, 1959 |
| 3,044,829 | Dolgorukov | July 17, 1962 |